US012146565B2

(12) United States Patent
Wu

(10) Patent No.: US 12,146,565 B2
(45) Date of Patent: Nov. 19, 2024

(54) GEAR UNIT HAVING A SHAFT AND A HOUSING PART

(71) Applicant: SEW-EURODRIVE GMBH & CO. KG, Bruchsal (DE)

(72) Inventor: Zili Wu, Tianjin (CN)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 25 days.

(21) Appl. No.: 18/013,975

(22) PCT Filed: Jun. 9, 2021

(86) PCT No.: PCT/EP2021/025204
§ 371 (c)(1),
(2) Date: Dec. 30, 2022

(87) PCT Pub. No.: WO2022/002433
PCT Pub. Date: Jan. 6, 2022

(65) Prior Publication Data
US 2024/0093776 A1 Mar. 21, 2024

(30) Foreign Application Priority Data

Jul. 1, 2020 (CN) .......................... 202010630610.5
Jul. 22, 2020 (DE) .......................... 102020004408.5

(51) Int. Cl.
F16H 57/04 (2010.01)
F16H 57/021 (2012.01)

(52) U.S. Cl.
CPC ....... *F16H 57/0472* (2013.01); *F16H 57/021* (2013.01); *F16H 57/0471* (2013.01)

(58) Field of Classification Search
CPC ..... F16H 57/0471; F16C 33/80; F16C 33/805
See application file for complete search history.

(56) References Cited

U.S. PATENT DOCUMENTS 4,348,067 A * 9/1982 Tooley ................... F16C 33/80
384/480
4,865,469 A * 9/1989 Haas ..................... F16C 19/185
384/480

(Continued)

FOREIGN PATENT DOCUMENTS

CN 201810755 U 4/2011
CN 106555868 A * 4/2017 ............. F16C 33/80

(Continued)

OTHER PUBLICATIONS

USPTO Machine Translation (retrieved from FIT database) of the Description of CN 201810755 U, Pan et al., Apr. 27, 2011. (Year: 2024).*

(Continued)

*Primary Examiner* — Daniel D Yabut
(74) *Attorney, Agent, or Firm* — Carter, DeLuca & Farrell LLP

(57) ABSTRACT

A gear unit includes a shaft and a housing part. A bearing is received in the housing part, and a flange part is connected to the housing part. The flange part is sealed from the shaft using a first and a second labyrinth seal, and the first labyrinth seal is axially spaced apart from the second labyrinth seal. The shaft has an elevation that is arranged axially, e.g., in the axial direction, between the first labyrinth seal and the second labyrinth seal.

24 Claims, 2 Drawing Sheets

(56) References Cited

U.S. PATENT DOCUMENTS

| | | | | | |
|---|---|---|---|---|---|
| 5,655,845 | A | * | 8/1997 | Lampart | ................. F16C 33/80 384/480 |
| 2011/0291363 | A1 | * | 12/2011 | Bartley | ................. F16C 33/768 277/412 |
| 2015/0159697 | A1 | * | 6/2015 | Fischer | ................. F16C 33/664 428/156 |

FOREIGN PATENT DOCUMENTS

| | | | | | |
|---|---|---|---|---|---|
| CN | 207018479 | U | | 2/2018 | |
| CN | 207111896 | U | * | 3/2018 | .............. F16C 33/80 |
| CN | 110159738 | A | | 8/2019 | |
| CN | 110397710 | A | | 11/2019 | |
| DE | 1946942 | U | | 9/1966 | |
| DE | 102021002928 | A1 | * | 1/2022 | ........... F16H 57/021 |

OTHER PUBLICATIONS

International Search Report issued in corresponding International Application No. PCT/EP2021/025204 dated Aug. 3, 2021, pp. 1-2, English Translation.

International Report on Patentability issued in corresponding International Application No. PCT/EP2021/025204 dated Dec. 13, 2022, pp. 1-8, English Translation.

* cited by examiner

GEAR UNIT HAVING A SHAFT AND A HOUSING PART

FIELD OF THE INVENTION

The present invention relates to a gear unit having a shaft and a housing part.

BACKGROUND INFORMATION

In certain conventional systems, a gear unit has a shaft that is connected to a toothed part and that is mounted in a housing part of the gear unit by a bearing.

A gear unit having a shaft and a housing part is described in Chinese Patent Document No. 207 018 479.

A sealing arrangement for a shaft is described in Chinese Patent Document No. 110 159 738.

SUMMARY

Example embodiments of the present invention provide a gear unit with a high degree safety against leakage.

According to example embodiments of the present invention, a gear unit includes a shaft and a housing part. A bearing, e.g., a bearing for rotatably mounting the shaft, is received in the housing part, and wherein a flange part is connected to the housing part. The flange part is sealed from the shaft using a first and a second labyrinth seal. The first labyrinth seal is axially spaced apart from the second labyrinth seal, and the shaft has an elevation, e.g., a circumferential elevation. The elevation is arranged axially, e.g., in the axial direction, between the first labyrinth seal and the second labyrinth seal.

Thus, the shaft can be sealed in a contactless manner and safety against leakage to the surroundings is increased in that the shaft has an elevation that in an idle state acts as a drip edge and when the shaft is in rotating operation acts as a centrifugal edge. To this end, the rotational axis of the shaft is substantially oriented horizontally. The oil captured in the second space about the elevation can be drained into the oil pan of the gear unit through a return line.

According to example embodiments, a clear first space is adjacent to the bearing, and the bearing can be supplied with lubricant, e.g., the roller bodies of the bearing can be supplied with lubricant, from the first space. The first space can be supplied with lubricant from the first radial bore via a first axial bore that passes through the housing part and that opens into a first radial bore of the flange. Thus, the bearing can be supplied with lubricating oil that can be transported via an oil transport arrangement out of the interior of the gear unit to the flange part and from there to the bearing received in the housing part.

According to example embodiments, a clear second space is arranged axially between the first labyrinth seal and the second labyrinth seal and is limited by the flange part, the first labyrinth seal, the second labyrinth seal, and the shaft. A second radial bore of the flange part opens into the second space, and a second axial bore passing through the housing part opens into the second radial bore. The second axial bore opens into the interior of the gear unit, e.g., for returning oil from the second space to the oil pan of the gear unit. Thus, oil that travels through the labyrinth seal can be returned to the oil pan.

According to example embodiments, the elevation is arranged on the shaft, and the second space is arranged such that oil dripping or spun off from the elevation travels into the second space. Thus, enhanced reliability can be achieved for capturing and returning leakage oil.

According to example embodiments, a stopper seals the first radial bore from the second space. For example, the first radial bore is sealed from the surroundings using a further stopper, and/or the second radial bore is sealed from the surroundings using a third stopper. Thus, simple production can be achieved by through-holes in the flange part while good tightness is still achievable.

According to example embodiments, the elevation is arranged axially between two circumferential annular grooves arranged on the shaft, e.g., which annular grooves are adjacent to the elevation. Thus, the elevation can be produced by forming two annular grooves. This is because adding the two annular grooves spaced apart from one another to a cylindrical surface creates an elevation without any further action being required.

According to example embodiments, the maximum diameter of the shaft in the region of the shaft adjacent to the first of the annular grooves equals the maximum diameter of the shaft in the region covered axially by the elevation. Thus, production is facilitated by adding the two grooves without any further action being required.

According to example embodiments, the maximum diameter of the shaft in the region of the shaft adjacent to the second of the annular grooves is equal to the maximum diameter of the shaft in the region covered axially by the elevation. Thus, production is facilitated by adding the two grooves without any further action being required.

According to example embodiments, the maximum diameter of the bearing seat of the inner ring of the bearing equals the maximum diameter of the shaft in the region covered axially by the elevation. Thus, production is facilitated by adding the two grooves without any further action being required.

According to example embodiments, the maximum diameter of the bearing seat of the inner ring of the bearing equals the maximum diameter of the shaft in the region covered by the elevation axially. Thus, production is facilitated by adding the two grooves without any further action being required.

According to example embodiments, the first radial bore is arranged as a stepped bore, and, for example, the stopper is arranged in a narrowed region of the first radial bore opening into the second region. Thus, production is readily facilitated.

According to example embodiments, the second radial bore is arranged as a stepped bore. Thus, production is readily facilitated.

According to example embodiments, an oil flow transported by an oil transport arrangement flows into the first radial bore. Thus, active or passive oil transport can be carried out and thus adequate lubrication of the bearing can be achieved.

According to example embodiments, the oil transport arrangement includes an oil pump driven by an electric motor or by a shaft of the gear unit and/or includes a device for capturing oil sprayed up during rotational movement of the toothed parts of the gear unit, e.g., against the direction of gravitational force. Thus, in the case of an electric motor, lubrication of the bearing can be carried out even when the gear unit is idle, e.g., even before starting, and that no motor is required for the pump when using the oil pump driven by the shaft, e.g., the shaft end pump.

According to example embodiments, the bearing is an angular contact bearing and/or the shaft is arranged as a hollow shaft. For example, the shaft is an output shaft of the gear unit, and the shaft has the greatest diameter of all shafts of the gear unit. Thus, high transverse forces added on the load-side can be absorbed.

According to example embodiments, the flange part is arranged integrally, e.g., in one part, with the first and/or second labyrinth seal. For example, the flange part, with the first and/or second labyrinth seal, is produced from a plastic as a plastic injection molded part; the flange part, with the first and/or second labyrinth seal, is produced from a metal; or the flange part, with the first and/or second labyrinth seal, is arranged as an added manufactured component in which the first and second radial bores are arranged as originally formed or additionally formed channels, e.g., are not produced by drilling. Thus, production is readily facilitated.

According to example embodiments, a sealing ring, e.g., a V ring, is arranged on the side of the first labyrinth seal facing axially away from the second space. For example, the sealing ring is connected rotationally-fixed to the shaft, e.g., is connected to the shaft in a non-positive fit, and a sealing lip of the sealing ring extends on a finely machined flat sealing surface arranged on the flange part or seals against this sealing surface, in which the normal of the plane containing the sealing surface is oriented parallel to the axial direction. Thus, dust protection and further sealing can be provided. The running surface is not on the shaft, however, but instead is on the flange part. A finely machined surface of the flange part, e.g., a surface of the flange part finely machined by grinding, is sufficient.

According to example embodiments, a cover plate is connected to the flange part on the side of the flange part facing away from the bearing, and, with the exception of a gap between the cover plate and the shaft, the radial spacing region covered by the cover plate includes the radial spacing region covered by the sealing ring. For example, the sealing lip of the sealing ring engages the finely machined surface of the flange part, and/or the cover plate is spaced apart from the shaft. Thus, further protection is provided. For example, the V ring can be protected in that the latter is radially enclosed by the cover plate and only a small gap between cover plate and shaft is free. However, since the sealing ring is seated directly on the shaft, and thus there is no gap between sealing ring and shaft, tightness in the axial direction is improved. The sealing ring uses a running surface arranged on the flange part, the running surface being oriented perpendicular to the surface of the shaft, however, that is, perpendicular to the direction of the rotational axis of the shaft.

According to example embodiments, an oil flow transported by an oil transport arrangement flows into the first radial bore. Thus, an oil flow is transported by an active and/or passive oil transport arrangement, e.g., adds potential energy to the oil in the gravitational field, and the oil flows by the shaft sealing ring or bearing, while it reduces the added potential energy. Thus, it is possible to supply lubricating oil for the shaft sealing ring and also for the bearing.

According to example embodiments, the oil transport arrangement includes an oil pump driven by an electric motor or by a shaft of the gear unit and/or includes a device for capturing oil sprayed up during rotational movement of the toothed parts of the gear unit, e.g., against the direction of gravitational force. Thus, when an electric motor is used, the oil lubricates the bearing even before the rotational movement of the shaft begins, and no separate and/or further energy supply for an electric motor of the oil pump is required when the oil pump is arranged as a shaft end pump.

According to example embodiments, an axial bore passing through the housing part opens into the first radial bore, e.g., such that lubricating oil of the gear unit can be transported into the first radial bore. Thus, production of an oil supply can be readily achieved.

According to example embodiments, the bearing is arranged as an angular contact bearing, and/or the shaft is arranged as a hollow shaft. For example, the shaft is an output shaft of the gear unit, and the shaft has the greatest diameter of all shafts of the gear unit. Thus, transverse forces can be added by the load driven by the shaft, and the bearing is able to absorb these transverse forces.

According to example embodiments, the flange part is arranged integrally, e.g., in one part, with the sealing ring. For example, the flange part, with the sealing ring, is produced from a plastic as a plastic injection molded part; the flange part, with the sealing ring, is produced from a metal; or the flange part, with the sealing ring, is arranged as an added manufactured component, in which the first and second radial bores are arranged as originally formed or additionally formed channels, e.g., are not produced by drilling.

Thus, production and improved tightness is facilitated. Very cost-effective production is possible with the configuration made of plastic. In the configuration made from metal, it is important that there is a sufficiently large gap in the labyrinth seal so that there is no contact with the shaft if transverse forces occur. In the case of the added manufactured component, the flange part, with the sealing ring, can be made from a metal, e.g., aluminum, or from a plastic.

According to example embodiments, the second radial bore of the flange part opens into a second axial bore that passes through the housing part and that opens into the interior of the gear unit. Thus, the transported oil, once the bearing or shaft sealing ring has been supplied, can be returned to the oil pan of the gear unit. From the oil pan, the oil transport arrangement transports the cooled oil or by the oil transport arrangement the upward-sprayed oil is supplied to the first radial bore and from there then to bearing or shaft sealing ring.

According to example embodiments, a cover plate is connected to the flange part, and the cover plate is arranged on the side of the sealing ring, e.g., the V ring, facing away from the bearing axially. Thus, a dust cover for the shaft sealing ring can be achieved. Only a narrow gap remains between cover plate and shaft. In addition, leakage oil has to overcome not only the two labyrinth seals and the interposed elevation, but also the sealing region of the sealing ring.

According to example embodiments, the radial spacing region covered by the cover plate includes the radial spacing region covered by the sealing ring with the exception of the radial spacing region covered by a sealing lip of the sealing ring. For example, the sealing lip of the shaft sealing ring contacts a finely machined running surface of the shaft, and the cover plate is spaced apart from the shaft. Thus, the cover plate covers the shaft sealing ring—with the exception of a narrow gap region to the shaft.

According to example embodiments, the sealing ring is produced from a plastic and/or rubber. Thus, production is facilitated and materials with low thermal resistance can be used due to the cool oil.

According to example embodiments, the sealing ring contacts the flange part entirely circumferentially with the exception of the circumferential angle regions covered by the first channel and by the second channel. Thus, a high level of tightness can be achieved for the second space with the higher temperature level.

According to example embodiments, the radial spacing region covered by the sealing ring includes the radial spacing region covered by the shaft sealing ring. Thus, the sealing ring and the shaft sealing ring are arranged on the same diameter.

According to example embodiments, the radial spacing region covered by the sealing ring overlaps with the radial spacing region covered by the shaft sealing ring. Thus, the sealing ring adequately shields the second space from the first space.

According to example embodiments, the first radial bore is sealed from the surroundings by a stopper inserted, at least in part, into the first radial bore. Thus, production is readily possible.

According to example embodiments, the second radial bore is sealed from the surroundings by a stopper inserted, at least in part, into the second radial bore. Thus, production is readily possible.

Further features and aspects of example embodiments of the present invention are explained in greater detail below with reference to the appended schematic Figures.

DETAILED DESCRIPTION

Figure 1:
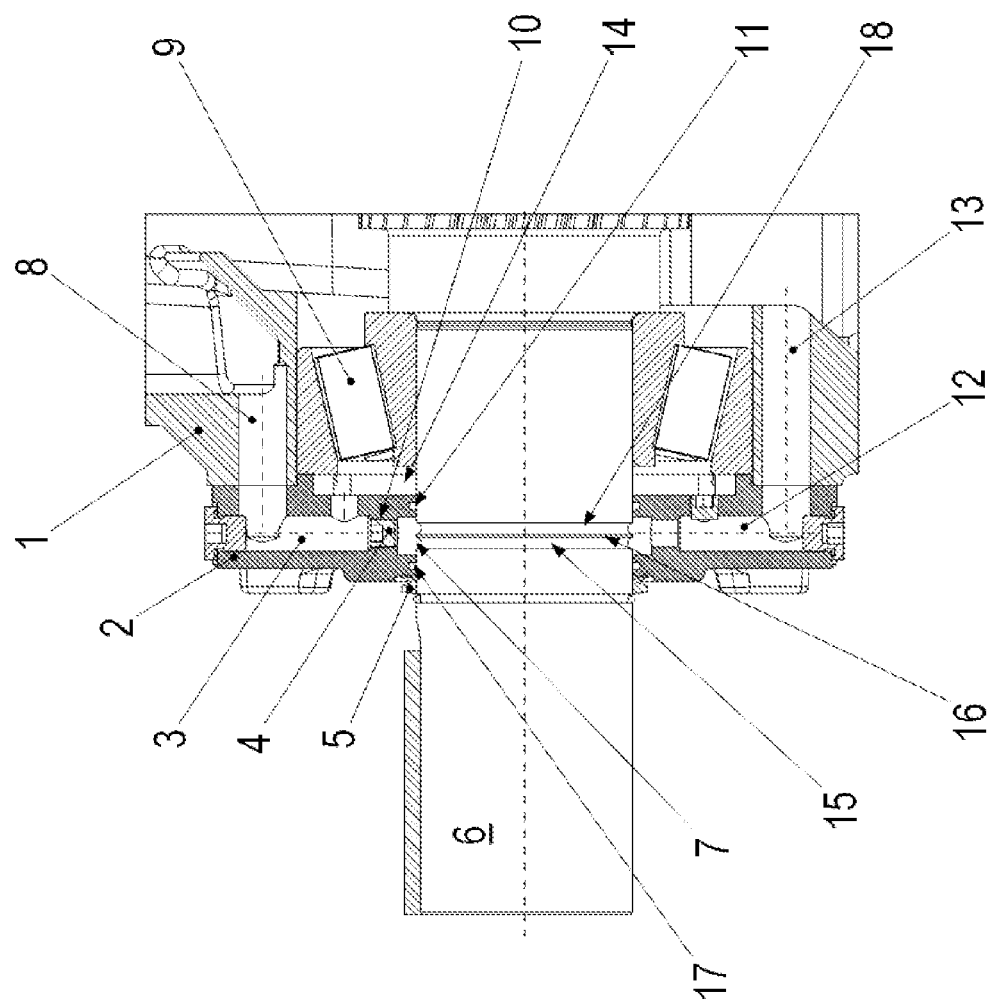
FIG. 1 is a cross-sectional view through a gear unit having a bearing arrangement according to an example embodiment of the present invention.
Figure 2:
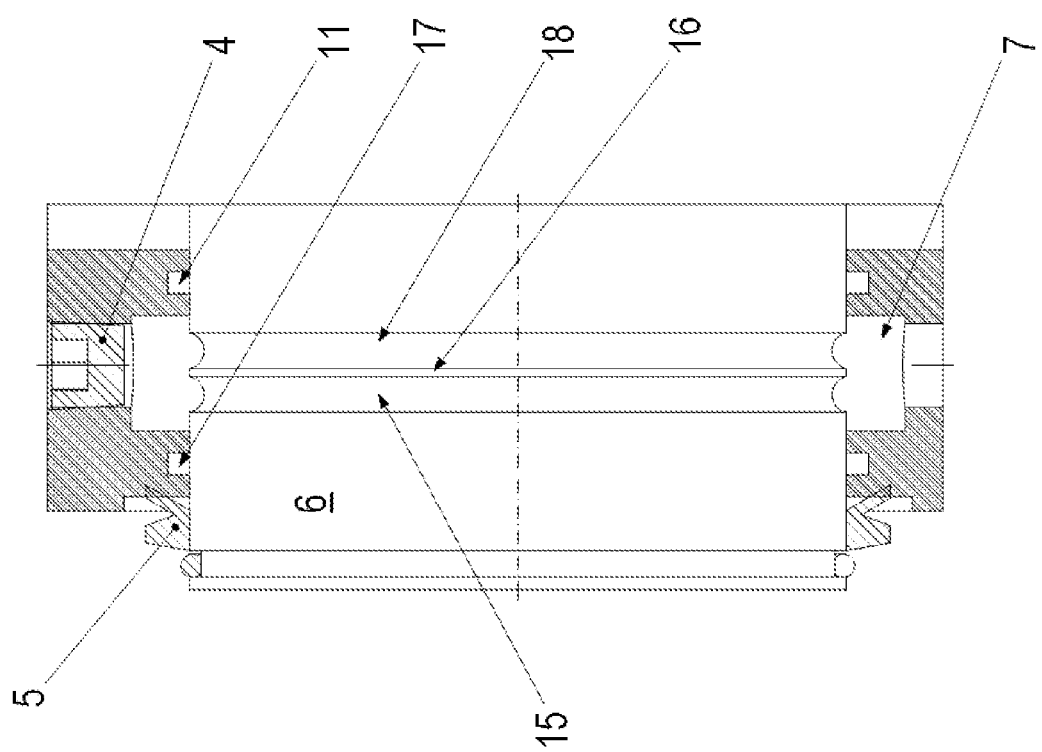
FIG. 2 is an enlarged view of a portion of FIG. 1.

As illustrated in the Figures, a shaft 6, e.g., a hollow shaft, is rotatably mounted by a bearing 9, e.g., an angular contact bearing. The bearing 9 is received in a housing part 1 of the gear unit.

The gear unit has a further shaft connected rotatably-fixed to a toothed part, the teeth of which are engaged with the teeth of a further toothed part connected rotatably-fixed to the shaft 6.

The housing of the gear unit is formed from the housing part 1 and further housing parts.

The toothed parts and lubricating oil are disposed in the interior enclosed by the housing. The interior is only partially filled with lubricating oil, so that in the idle state there is an oil level in the interior that does not reach the roller bodies of the bearing 9, or reaches only some of them, e.g., only the lowest roller bodies of the bearing 9.

Therefore, the gear unit has an active and/or passive oil transport arrangement with which, at least when the gear unit is operating, all of the roller bodies of the bearing 9, e.g., even the highest roller bodies, are supplied with lubricating oil from the oil pan, e.g., lubricating oil disposed below the level of the oil.

To this end, the housing part 1 has a first axial bore 8 through which the transported lubricating oil is supplied to a first radial bore 3 arranged in the flange part 2 that covers the bearing 9 against the surroundings.

The flange part 2 is sealingly connected to the housing part 1 by screws and an interposed flat seal.

The first radial bore 3 opens into an annular, clear first space 14 adjacent to the bearing 9 and, e.g., to the roller bodies of the bearing 9. Thus, the bearing 9 can be lubricated with lubricating oil via the first radial bore 3 and the annular, clear first space 14.

The clear first space 14 is immediately adjacent to the bearing 9 and covers at least the radial free space existing between the inner ring and the outer ring of the bearing 9. Thus, the region covered axially by the first space is immediately adjacent to the region covered axially by the bearing 9. The radial spacing region covered by the first space 14 is included by the radial spacing region covered by the bearing. This is because, in certain arrangements, the inner ring of the bearing 9 is positioned against a securing ring arranged on the shaft 6 or, in the example embodiment illustrated in FIG. 1, against a step of the shaft 6. Likewise, the outer ring is also axially limited with a ring part or, according to the example embodiment illustrated in FIG. 1, by the flange part 2 itself.

The radial distance is relative to the rotational axis of the shaft 6, the axial direction is parallel to the direction of the rotational axis of the shaft 6.

The shaft 6 is, for example, arranged as an output shaft.

The shaft 6 is sealed from the flange part 2 in a contactless manner by a first labyrinth seal 17 and a labyrinth seal 11 axially spaced apart therefrom. Both labyrinth seals 11, 17 are received or arranged on the flange part 2, e.g., using corresponding circumferential annular grooves.

A second space 7 is arranged between the two labyrinth seals 11, 17. The space 7 is also annular. The stopper 4 separates the space 7 from the first radial bore 3.

The shaft 6 has a first annular groove 15 and a second annular groove 18 axially spaced apart from the first annular groove axially between the first labyrinth seal 17 and the second labyrinth seal 11. A circumferentially continuous elevation 16 is arranged axially between the two grooves 15, 18. The greatest outer diameter of the elevation 16 corresponds to the outer diameter of the shaft 6 in the region of the first labyrinth seal 17 and to the outer diameter of the shaft 6 in the region of the second labyrinth seal 11.

Since the two annular grooves 15 and 18 are thus cut deeper radially, any oil entering the annular grooves 15, 18, e.g., leakage oil, is driven to the elevation 16 by the centrifugal force effected during the rotational movement of the shaft 6 and is then spun off. In the idle state, the elevation 16 functions as a drip edge for such oil. In any case, the oil detaching from the elevation 16 is captured in the second space 7 and from there is transported to a return. As the return, the second space 7 opens at its lower end region in the gravitational direction into a second radial bore 12 of the flange part 2, which is sealed from the surroundings with a further stopper and opens into a second axial bore 13 passing through the housing part 1 and itself opens into the interior space of the gear unit and thus returns the oil to the oil pan of the gear unit, the oil pan being arranged in the interior.

The first radial bore 3 is connected to the first space for lubricating the bearing 9, e.g., the roller bodies of the bearing 9. Thus, the oil transported by an oil transport arrangement is able to travel via the first axial bore 8 passing through the housing part 1 into the first radial hole 3 and from there to the first space 14, so that the bearing 9, e.g., the roller bodies of the bearing 9, can be supplied with lubricating oil.

To connect the first radial bore added to the flange part 2 to the first space 14, an axial bore passing through the flange part 2 from the first radial bore 3 opens in the first space 14.

Since the first space 14 is thus at least partially filled with oil and is immediately adjacent to the bearing 9, e.g., to the roller bodies of the bearing, supply of lubricant for the bearing 9 is assured. However, the second labyrinth seal 11 is arranged in a contactless manner. To this end, a gap is arranged between the flange part 2 and the shaft 6, so that there is no contact between flange part 2 and shaft 6. Thus, it is not possible to absolutely prevent small quantities of oil from being able to travel through the second labyrinth seal 11 along the surface of the shaft 6 into the second space 7. For example, this undesired oil is therefore also called leakage oil.

As described in the foregoing, this oil is guided into the return by the elevation 16 acting as a drip edge and/or centrifugal edge. In addition, the first labyrinth seal 17 is also provided, so that the safety against leakage oil makes it possible to reach a very high level of safety.

The second labyrinth seal 11 is arranged axially between the bearing 9 or the first space 14 and the second space 7.

The annular grooves 15, 18 and the elevation 16 arranged axially between these annular grooves 15, 18 are arranged axially between the two labyrinth seals 11, 17.

A further sealing ring, e.g., arranged as a V ring 5, is arranged on the side of the first labyrinth seal 17 axially facing away from the second space 7.

This V ring is fitted onto the shaft 6 and connected to the shaft in a non-positive fit and thus rotatably-fixed. The sealing lip of the V ring 5 extends on a finely machined flat sealing surface, and the normal of the plane containing the sealing surface is oriented parallel to the axial direction.

The axial direction is parallel to the direction of the rotational axis of the shaft 6.

In a further exemplary embodiment, a cover plate is connected to the flange part 2, e.g., is connected by screws, the threaded regions of which are screwed into threaded holes of the flange part 2 and the heads of which press the cover plate against the flange part 2.

The cover part thus covers the V ring 5 against the surroundings. For example, the radial spacing region covered by the cover plate includes the radial spacing region covered by the V ring 5 with the exception of the radial spacing region covered by the sealing lips of the shaft sealing ring 5.

The cover plate 1 protects the V ring 5 from particles of dirt.

The return, including the second radial bore 12 of the flange part 2 and the axial bore 13 passing through the housing part 1, is arranged in the lower region of the first space. The return can be produced in a cost-effective manner because the return for the oil is arranged on the flange part 2 in that the first space 7 opens into the second radial bore 12 of the flange part 2, which second radial bore opens into a second axial bore 13 of the housing part 1, which axial bore returns the oil to the oil pan, e.g., together with the oil that has come into contact with the roller bodies of the bearing 9.

The heat added to the oil pan with the oil can then spread out and some of this heat can be dissipated into the surroundings via the housing of the gear unit. The oil cooled in this manner can again be transported to the first axial bore 8 of the housing part 1 by the active and/or passive oil transport arrangement. The oil flow transported in this manner flows past the roller bodies of the bearing 9.

The cover plate, flange part 2, and housing part 1 are made of metal, e.g., steel.

For receiving the labyrinth seals 11, 17, the flange part 2 has a corresponding seat which is finely machined, e.g., ground, and/or correspondingly formed. The labyrinth seals 11, 17 received on the seat seal the flange part 2 from the shaft 6 in a contactless manner.

For receiving the bearing 9, the housing part 1 has a finely machined, e.g., ground, bearing seat. The bearing 9 received in the seat mounts the shaft 6.

The flange part 2 has a centering seat with which the flange part is centered on the bearing hole of the bearing 9. To this end, the bearing hole is arranged and finely machined as a cylindrical recess in the housing part 1 of the gear unit, and the outer ring of the bearing 9 is inserted into the bearing set produced in this manner. A cylindrical centering unit of the flange part 2 is inserted into the bearing hole on the edge of the hole. The flange part 2 is centered on the housing part 1 by the centering unit. However, the centering unit of the flange part 2 also functions as the axial limit for the outer ring of the bearing 9, the inner ring of which is positioned against a shaft collar of the shaft 6.

The inner ring is limited in the axially opposing direction by a securing ring arranged in a circumferential annular groove of the shaft 6.

According to exemplary embodiments, the flange part 2, together with the labyrinth seals 11, 17, is produced integrally, e.g., in one piece, from plastic. For example, an additive production method, e.g., a 3D printer, is used for producing such a flange part 2 with integrated labyrinth seals 11, 17. For example, the flange part 2 with integrated labyrinth seals 11, 17 is made of plastic. Thus, good heat insulation can be achieved between the first space 14 and the second space 7.

Alternatively, however, the flange part 2, with the labyrinth seals 11, 17, can be made of metal. There is a sufficiently large gap between the labyrinth seals 11, 17 and the shaft 6 to prevent the shaft from contacting the sealing ring 4 when transverse forces occur.

Metal configurations can also be produced in an additive manner, in which appropriately formed holes can be provided instead of the bores.

LIST OF REFERENCE NUMERALS

1 Housing part
2 Flange part
3 First radial bore
4 Stopper
5 V ring
6 Shaft, e.g., hollow shaft
7 Second space
8 First axial bore
9 Bearing, e.g., angular contact bearing
10 Channel
11 Second labyrinth seal
12 Second radial bore
13 Second axial bore
14 First space
15 First annular groove
16 Elevation
17 First labyrinth seal
18 Second annular groove

The invention claimed is:
1. A gear unit, comprising:
a shaft;
a housing part;
a bearing received in the housing part; and
a flange part is connected to the housing part and sealed from the shaft by a first labyrinth seal and a second labyrinth seal, the first labyrinth seal being axially spaced apart from the second labyrinth seal;
wherein the shaft includes an elevation arranged axially between the first labyrinth seal and the second labyrinth seal; and
wherein a clear first space is arranged adjacent to the bearing, the clear fist space being adapted to supply the bearing with lubricant, a first radial bore of the flange being adapted to supply the clear first space lubricant via a first axial bore that passes through the housing part and that opens into the first radial bore of the flange.

2. The gear unit according to claim 1, wherein the first space is adapted to supply roller bodies of the bearing with the lubricant.

3. The gear unit according to claim 1, wherein a clear second space is arranged axially between the first labyrinth seal and the second labyrinth seal and is limited by the flange part, the first labyrinth seal, the second labyrinth seal, and the shaft, a second radial bore of the flange part opening into the clear second space, a second axial bore passing through the housing part opening into the second radial bore, the second axial bore opens into an interior of the gear unit.

4. The gear unit according to claim 3, wherein the elevation is arranged on the shaft and the clear second space is arranged such that oil dripping or spun off from the elevation travels into the clear second space.

5. The gear unit according to claim 3, wherein a stopper seals the first radial bore from the clear second space.

6. The gear unit according to claim 5, wherein the first radial bore is sealed from the environment by a further stopper and/or wherein the second radial bore is sealed from the environment by a third stopper.

7. The gear unit according to claim 3, wherein the first radial bore and/or the second radial bore is arranged as a stepped bore.

8. The gear unit according to claim 7, wherein a stopper is arranged in a narrowed region of the first radial bore opening into the clear second space.

9. The gear unit according to claim 3, wherein a sealing ring is arranged on a side of the first labyrinth seal facing axially away from the clear second space.

10. The gear unit according to claim 9, wherein the sealing ring is connected rotationally-fixed to the shaft and/or non-positively fit to the shaft, and a sealing lip of the sealing ring extends on a flat sealing surface arranged on the flange part or seals against the sealing surface, a normal of a plane that includes the sealing surface being oriented parallel to an axial direction.

11. The gear unit according to claim 9, wherein the sealing ring is arranged as a V ring.

12. The gear unit according to claim 9, wherein a cover plate is connected to the flange part on a side of the flange part facing away from the bearing, with the exception of a gap between the cover plate and the shaft, a radial spacing region covered by the cover plate includes a radial spacing region covered by the sealing ring.

13. The gear unit according to claim 9, wherein the sealing ring is connected rotationally-fixed to the shaft and/or non-positively fit to the shaft, and a sealing lip of the sealing ring extends on a sealing surface arranged on the flange part or seals against the sealing surface, a normal of a plane that includes the sealing surface being oriented parallel to an axial direction.

14. The gear unit according to claim 1, wherein an oil transport device is adapted to transport an oil flow into the first radial bore.

15. The gear unit according to claim 14, wherein the oil transport device includes an oil pump adapted to be driven by an electric motor or by a shaft of the gear unit and/or includes an oil capture device adapted to capture oil sprayed up during rotational movement of toothed parts of the gear unit.

16. A gear unit, comprising:
a shaft;
a housing part;
a bearing received in the housing part; and
a flange part is connected to the housing part and sealed from the shaft by a first labyrinth seal and a second labyrinth seal, the first labyrinth seal being axially spaced apart from the second labyrinth seal;
wherein the shaft includes an elevation arranged axially between the first labyrinth seal and the second labyrinth seal;
wherein the elevation is arranged axially between two circumferential annular grooves arranged on the shaft; and
wherein a maximum diameter of the shaft in a region of the shaft adjacent to a first one of the annular grooves equals a maximum diameter of the shaft in a region covered axially by the elevation, and/or a maximum diameter of the shaft in a region of the shaft adjacent to a second one of the annular grooves is equal to the maximum diameter of the shaft in the region covered axially by the elevation.

17. A gear unit, comprising:
a shaft;
a housing part;
a bearing received in the housing part; and
a flange part is connected to the housing part and sealed from the shaft by a first labyrinth seal and a second labyrinth seal, the first labyrinth seal being axially spaced apart from the second labyrinth seal;
wherein the shaft includes an elevation arranged axially between the first labyrinth seal and the second labyrinth seal; and
wherein a maximum diameter of a bearing seat of an inner ring of the bearing equals a maximum diameter of the shaft in a region covered axially by the elevation.

18. The gear unit according to claim 17, wherein the bearing is adapted to rotatably mount the shaft, and the elevation is arranged as a circumferential elevation.

19. The gear unit according to claim 17, wherein the elevation is arranged axially between two circumferential annular grooves arranged on the shaft.

20. The gear unit according to claim 19, wherein the annular grooves are arranged adjacent to the elevation.

21. The gear unit according to claim 17, wherein the bearing is arranged as an angular contact bearing and/or the shaft is arranged as a hollow shaft.

22. The gear unit according to claim 21, wherein the shaft is arranged as an output shaft of the gear unit and has a greatest diameter of all shafts of the gear unit.

23. The gear unit according to claim 17, wherein the flange part is integral with the first labyrinth seal and/or second labyrinth seal.

24. The gear unit according to claim 23, wherein (a) the flange part and the first labyrinth seal and/or the second labyrinth seal is arranged as a plastic injection molded part, (b) the flange part and the first labyrinth seal and/or the second labyrinth seal is formed of a metal, or (c) the flange part and the first labyrinth seal and/or the second labyrinth seal is arranged as an added manufactured component in which first and second radial bores are arranged as originally formed or additionally formed channels and not drilled.

* * * * *